(12) United States Patent
Daniluk et al.

(10) Patent No.: US 12,405,131 B2
(45) Date of Patent: Sep. 2, 2025

(54) TERRAIN VERIFICATION SYSTEM AND METHOD FOR PALLET DROP

(71) Applicant: Caterpillar Inc., Peoria, IL (US)

(72) Inventors: Steven John Daniluk, San Francisco, CA (US); Donald Spencer Davis, Garner, NC (US)

(73) Assignee: Caterpillar Inc., Peoria, IL (US)

( * ) Notice: Subject to any disclaimer, the term of this patent is extended or adjusted under 35 U.S.C. 154(b) by 171 days.

(21) Appl. No.: 18/115,489

(22) Filed: Feb. 28, 2023

(65) Prior Publication Data

US 2024/0288280 A1     Aug. 29, 2024

(51) Int. Cl.

| | |
|---|---|
| *G01C 21/00* | (2006.01) |
| *B65G 67/24* | (2006.01) |
| *G01B 21/30* | (2006.01) |
| *G01C 11/02* | (2006.01) |
| *G01S 17/89* | (2020.01) |
| *G05D 1/00* | (2024.01) |

(52) U.S. Cl.
CPC ......... *G01C 21/3826* (2020.08); *B65G 67/24* (2013.01); *G01B 21/30* (2013.01); *G05D 1/0214* (2013.01); *G01C 11/02* (2013.01); *G01S 17/89* (2013.01)

(58) Field of Classification Search
CPC .... G01C 21/3826; G01C 11/02; B65G 67/24; G01B 21/30; G05D 1/0214; G01S 17/89
USPC .......................................................... 701/23
See application file for complete search history.

(56) References Cited

U.S. PATENT DOCUMENTS

| | | | |
|---|---|---|---|
| 6,539,294 B1 | 3/2003 | Kageyama | |
| 8,165,746 B2 | 4/2012 | Tueshaus | |
| 9,449,397 B2 | 9/2016 | Chang et al. | |
| 9,983,589 B2 | 5/2018 | Foster et al. | |
| 10,288,166 B2 | 5/2019 | Chrungoo et al. | |
| 10,458,938 B2 | 10/2019 | Wold et al. | |
| 11,324,375 B2 | 5/2022 | Koebrick et al. | |
| 12,026,956 B1* | 7/2024 | Purdy | B60W 60/0015 |
| 2008/0011554 A1 | 1/2008 | Broesel et al. | |
| 2018/0220577 A1* | 8/2018 | Posselius | A01B 63/1112 |

(Continued)

FOREIGN PATENT DOCUMENTS

| | | | | |
|---|---|---|---|---|
| GB | 2552024 A | * | 1/2018 | ......... B60K 31/0008 |
| JP | 04237617 A | * | 1/1991 | |
| JP | 2022034408 A | | 3/2022 | |

OTHER PUBLICATIONS

English translation of JP-04237617-A, obtained via EspaceNet Jan. 2025 (Year: 2025).*

*Primary Examiner* — Krishnan Ramesh

(57) ABSTRACT

A work machine includes a terrain verification system for dropping a pallet on a land surface at a destination. Operating autonomously or semi-autonomously, the work machine includes a range sensor, an image sensor, and an inertial sensor to assess the slope and roughness of the land surface on approach to the destination. The terrain verification system generates a ground map of the destination from range data received by the range sensor and generates a roughness metric indicative of the surface. Image data received by the image sensor is used to verify the roughness metric and, when obstructions are found from the image data, the system moves the work machine over the land surface and evaluates pitch and roll data from the inertial sensor to determine the condition of the destination for dropping the pallet.

20 Claims, 5 Drawing Sheets

(56) References Cited

U.S. PATENT DOCUMENTS

| | | | |
|---|---|---|---|
| 2021/0174088 A1 | 6/2021 | Maley et al. | |
| 2021/0282310 A1* | 9/2021 | Birkland | B60W 50/14 |
| 2023/0166728 A1* | 6/2023 | Hosaka | G01S 17/42 |
| | | | 701/28 |
| 2023/0184563 A1* | 6/2023 | Arreaza | G01C 21/3822 |
| | | | 701/450 |
| 2023/0217858 A1* | 7/2023 | Vandike | G01C 21/3826 |
| | | | 701/37 |
| 2024/0217504 A1* | 7/2024 | Sallee | B60W 40/068 |

* cited by examiner

TERRAIN VERIFICATION SYSTEM AND METHOD FOR PALLET DROP

TECHNICAL FIELD

The present disclosure relates to a work machine having a terrain verification system and a method for dropping a pallet on the terrain. More specifically, the present disclosure relates to a work machine and terrain verification system that use an image sensor, a range sensor, and an inertial sensor to ensure a pallet is dropped by the work machine on smooth terrain.

BACKGROUND

Work machines, such as compact track loaders or fork lifts, may travel around a worksite to perform various tasks, such as delivering material to one or more locations or drop sites within the worksite. While traditionally operated manually, these work machines may also be partially controlled by software on the work machine and/or a central computing system, i.e., semi-autonomous operation, or completely managed by software without operator involvement, i.e., autonomous operation.

In either mode of operation with computer control, challenges exist in determining whether the location, or drop site, is safe for delivery of the material. For example, delivery routes for the work machines may span a large outdoor area. While the material may require a relatively flat or level surface on which it may be placed, the ground at the drop site may be uneven due to sloping, troughs, or ruts, or may contain obstructions such as rocks, debris, or vegetation. Unaware of this unevenness, an autonomous or semi-autonomous work machine programmed to deliver the material to the drop site may release the load onto the surface, possibly leading to damage of the material.

Various systems have been developed for using sensors to affect operation of work machines around a job site. These systems, however, do not consider using multiple sensors in combination to evaluate the condition of a drop site before releasing a payload of material, such as dropping a pallet from forks of the work machine.

One approach for using sensors to assist movement of a work machine at a job site is described in U.S. Pat. No. 10,458,938 ("the '938 patent"). The '938 patent describes an industrial truck, such as those used in warehouses or outdoor storage depots, having a sensor device and a memory. The sensor device records into memory irregularities along a delivery route, such as potholes or bumps. Using the history of irregularities, the truck may automatically influence a driver's control when on the delivery route again by reducing speed or setting a steering angle to minimize the risk in hitting the irregularities or by providing a warning. Among other things, the '938 patent does not contemplate using a plurality of sensors to detect the levelness or smoothness of terrain at a drop site not previously traversed by an autonomous or semi-autonomous work machine. As a result, the '938 patent is not desirable for work machines programmed to release material at a drop site.

Examples of the present disclosure are directed to overcoming deficiencies of such systems.

SUMMARY

In an aspect of the present disclosure, a movable work machine includes a chassis, a range sensor, an image sensor, and an inertial sensor. The range sensor is coupled to the chassis and configured to generate range data indicative of topology of the land surface at a destination of the movable work machine. The image sensor is coupled to the chassis and configured to generate image data indicative of the topology. The inertial sensor, also coupled to the chassis, is configured to generate orientation data for the movable work machine during traversal of the land surface. The moveable work machine further includes a terrain verification system that includes a terrain mapper, an obstruction detector, a localization system, and a roughness processor. The terrain mapper is configured to convert the range data into a ground map of the land surface, and the obstruction detector is configured to identify one or more obstructions on the land surface from the image data. The localization system is configured to evaluate orientation of the movable work machine from at least the orientation data. A roughness processor is configured to determine a roughness metric representative of the topology of the land surface based on at least ground map and to evaluate the roughness metric for accuracy with respect to the image data.

In another aspect of the present disclosure, a method for verifying terrain at a drop site for a work machine, includes receiving, by the work machine, an image signal indicative of image data of land surface at the drop site, and receiving, by the work machine, a range signal indicative of range data of the land surface. The method further includes detecting, by the work machine, an obstruction on the land surface from the image data, and, based at least in part on the detecting the obstruction, causing the work machine to move over the land surface. During movement over the land surface, the work machine receives inertial data indicative of at least pitch and roll of the work machine. The method continues with determining a roughness metric for the land surface based at least in part on the pitch and roll of the work machine from the inertial data.

In yet another aspect of the present disclosure, a semi-autonomous compact loader includes a chassis, traction devices coupled between the chassis and ground, and a work tool coupled to a front of the chassis with respect to a direction of forward travel of the semi-autonomous compact loader, where the work tool is configured to enable lifting and lowering a payload. The semi-autonomous compact loader also includes a range sensor configured to generate range data indicative of topology of a land surface at a destination proximate to the semi-autonomous compact loader, an image sensor configured to generate image data indicative of the topology, and an inertial sensor configured to generate orientation data for the semi-autonomous compact loader during traversal of the land surface. Further, a terrain mapper is configured to convert the range data into a ground map of the land surface, an obstruction detector is configured to identify one or more obstructions on the land surface from image data, and a localization system is configured to evaluate orientation of the semi-autonomous compact loader from at least the orientation data. A roughness processor is configured to determine a roughness metric representative of the topology of the land surface based on at least the ground map and to evaluate the roughness metric for validity with respect to the image data.

DETAILED DESCRIPTION

Consistent with the principles of the present disclosure, an autonomous or semi-autonomous work machine may include a terrain verification system, typically embedded within its hardware and/or software, for verifying the condition of a land surface at a drop site for the work machine. In some examples, the work machine is configured with forks and may carry a payload on the forks for delivery to the drop site. Using sensors on the work machine, the terrain verification system generates a ground map of the land surface at the drop site using collected range data and checks for any obstructions on the land surface using collected image data. In some examples, when image analysis detects an obstruction, the terrain verification system may cause the work machine to drive over the drop site and use inertial data from inertial sensors to assess whether the obstruction is deformable (e.g., vegetation) or would impede the drop operation (e.g., rocks or logs). The following describes several examples for carrying out the principles of this disclosure. Wherever possible, the same reference numbers will be used throughout the drawings to refer to the same or like parts.

Figure 1:
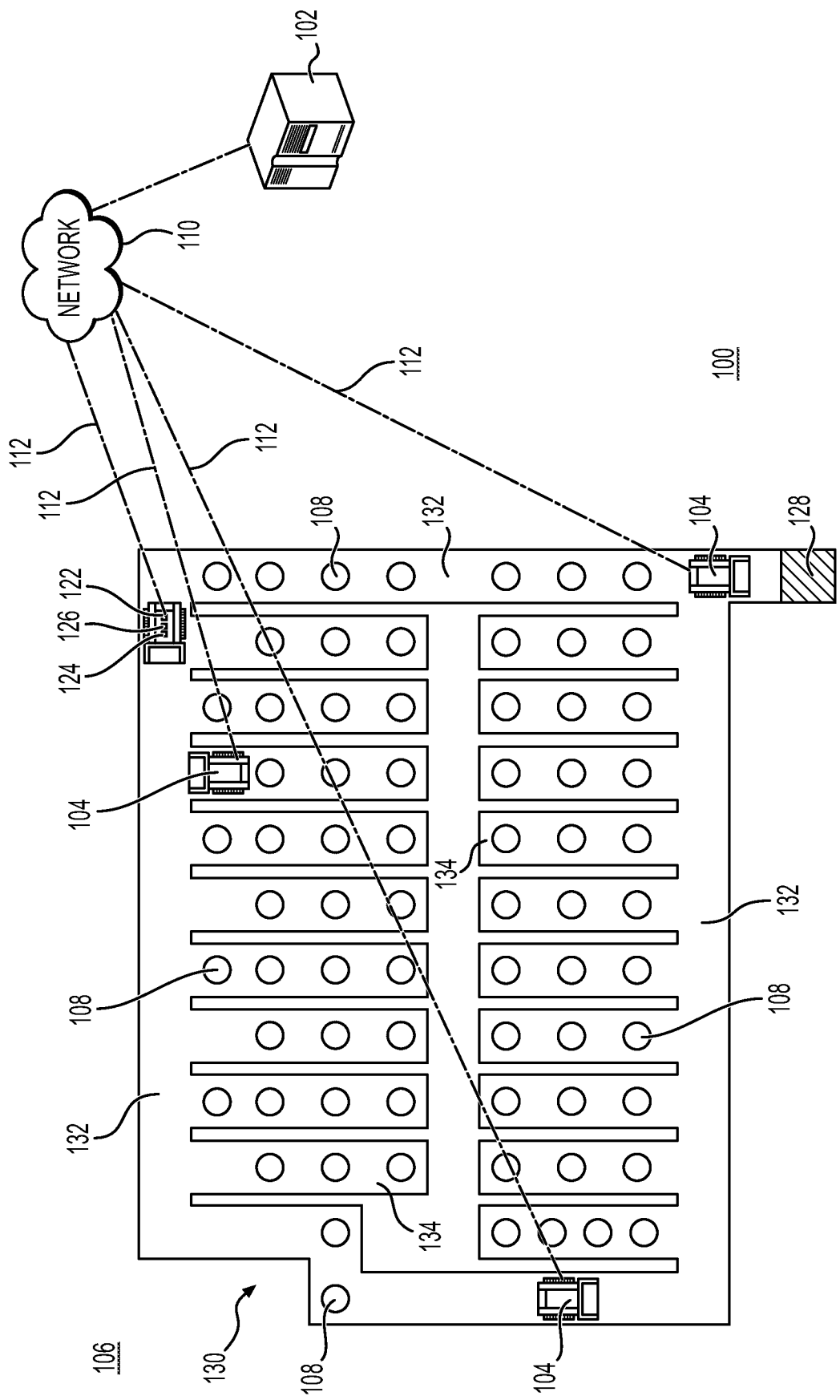
FIG. 1 is a top view schematic diagram of a worksite in accordance with an example of the present disclosure.

FIG. 1 is a top view schematic diagram of an example system 100 including a computing system 102 and machines 104 within a worksite 106. During a job at worksite 106, a fleet of one or more machines 104 can be configured to deliver material from a pick-up location to a set of drop points 108 within the worksite 106. Worksite 106 can be any geographic area for distribution, although the present disclosure is directed to exposed, outdoor land. In one non-limiting example, worksite 106 can be a solar farm that is under construction across an expanse of land. The drop points 108 can be locations at worksite 106 where machines 104 are to deliver solar panels, solar panel installation equipment, and/or other materials. In some examples discussed further below, machines 104 may include a work tool in the form of forks for lifting, carrying, and placing the materials packaged with or resting on a pallet.

While discussed for illustration as a solar farm, worksite 106 can be a construction site, a mine site, a quarry, or any other type of worksite or work environment at which material can be delivered to defined drop points 108. The machines 104 at worksite 106 can be compact track loaders (CTLs), skid steer loaders, track loaders, haul trucks, wheel loaders, or any other type of machine that can transport material from one location to another at worksite 106. The material can be solar panels, construction materials, dirt, gravel, and/or any other type of material that is to be delivered to drop points 108 at worksite 106.

Computing system 102 can be one or more servers, computers, or other off-board computing devices that are separate from machines 104. For example, while machines 104 are located at the worksite 106, computing system 102 can be located at a back office or other location that is remote from machines 104 at the worksite 106, or that is remote from worksite 106 overall. As illustrated in FIG. 1, computing system 102 can communicate wirelessly with at least machines 104 via a network 110. In some examples, computing system 102 can generate machine instructions 112 associated with a job for one or more of machines 104 to operate autonomously or semi-autonomously within worksite 106.

As discussed above, drop points 108 can be locations within worksite 106 that are to receive a payload of material delivered by machines 104. Staging area 128 can be an area where machines 104 can pick up or obtain the material, before transporting the material from staging area 128 to one or more individual drop points 108. For example, if worksite 106 is a solar farm that is under construction, delivery trucks or other machines can deliver a set of solar panels to staging area 128. One or more machines 104, such as CTLs under the direction of machine instructions 112, can then transport individual solar panels from staging area 128 to individual drop points 108 at or near where the solar panels will be installed. In some examples, there may be more than one staging area 128 at worksite 106.

Paths 130 can be roads, passable routes, and/or other pathways through the worksite 106. For example, the paths can extend from staging area 128 and drop points 108, such that machines 104 can navigate paths 130 to deliver material from staging area 128 to drop points 108. The drop points 108 can be located on or near paths 130. In some examples, paths 130 can include main paths 132 and/or dead-end paths 134, as shown in FIG. 1. The dead-end paths 134 may branch off from main paths 132.

Machine instructions 112 for a particular machine 104, whether received from computing system 102 or previously stored within the machine, can indicate when and/or where the particular machine is to load material, which drop points 108 the machine is to deliver the material to, route segments that the machine is to traverse in a loaded or unloaded state, when the machine is to traverse such route segments, when and/or where the machine is to wait at worksite 106 while loaded or unloaded, and/or other scheduling or routing information. Machine instructions 128 for a machine can also indicate instructions associated with machine operations that the machine is to perform at locations within worksite 106, such as particular loading or unloading operations, or speeds the machine is to travel at during one or more segments of a cycle.

Figure 2:
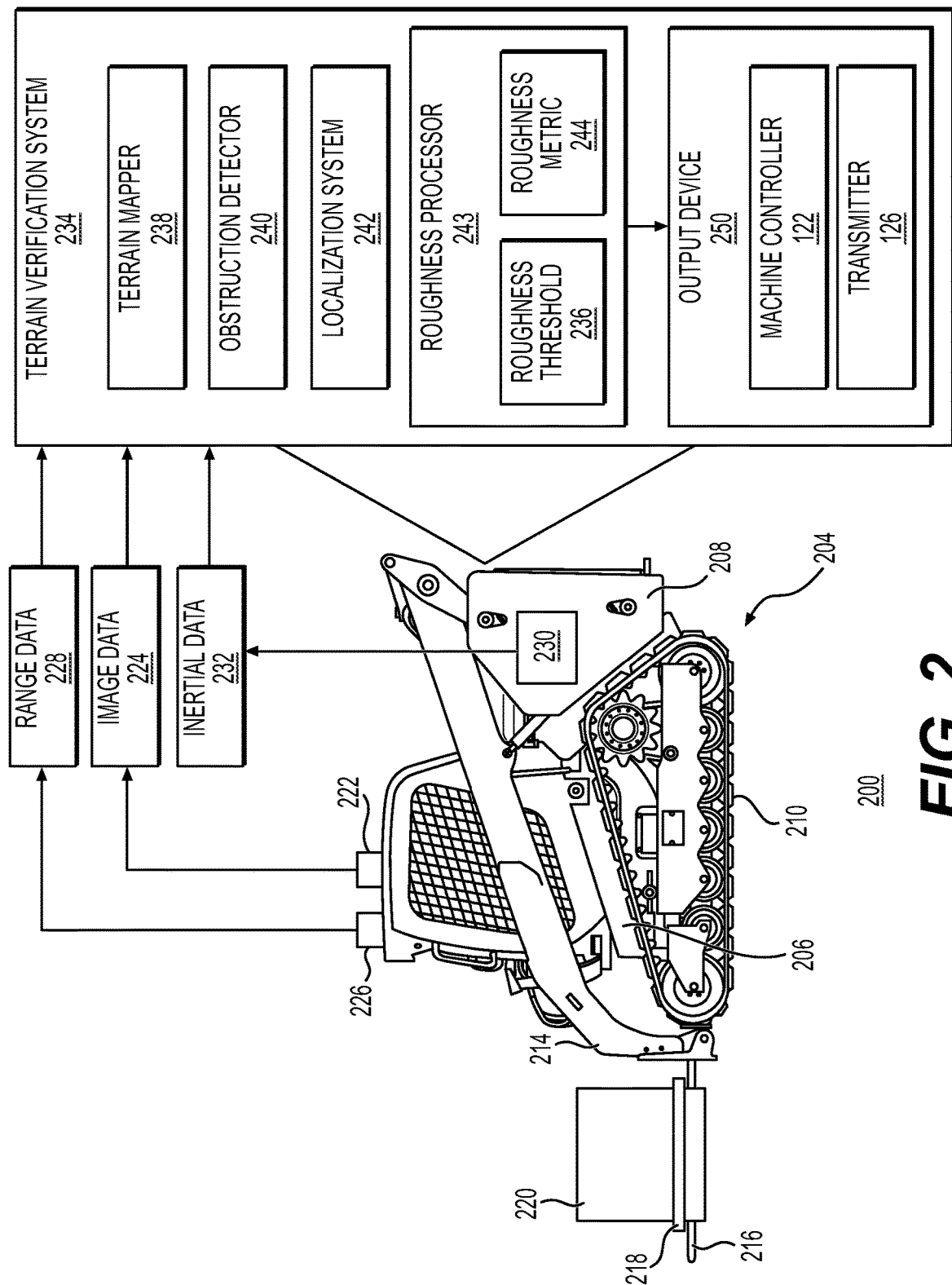
FIG. 2 is a side view of a semi-autonomous work machine and block diagram in accordance with an example of the present disclosure.
Figure 3:
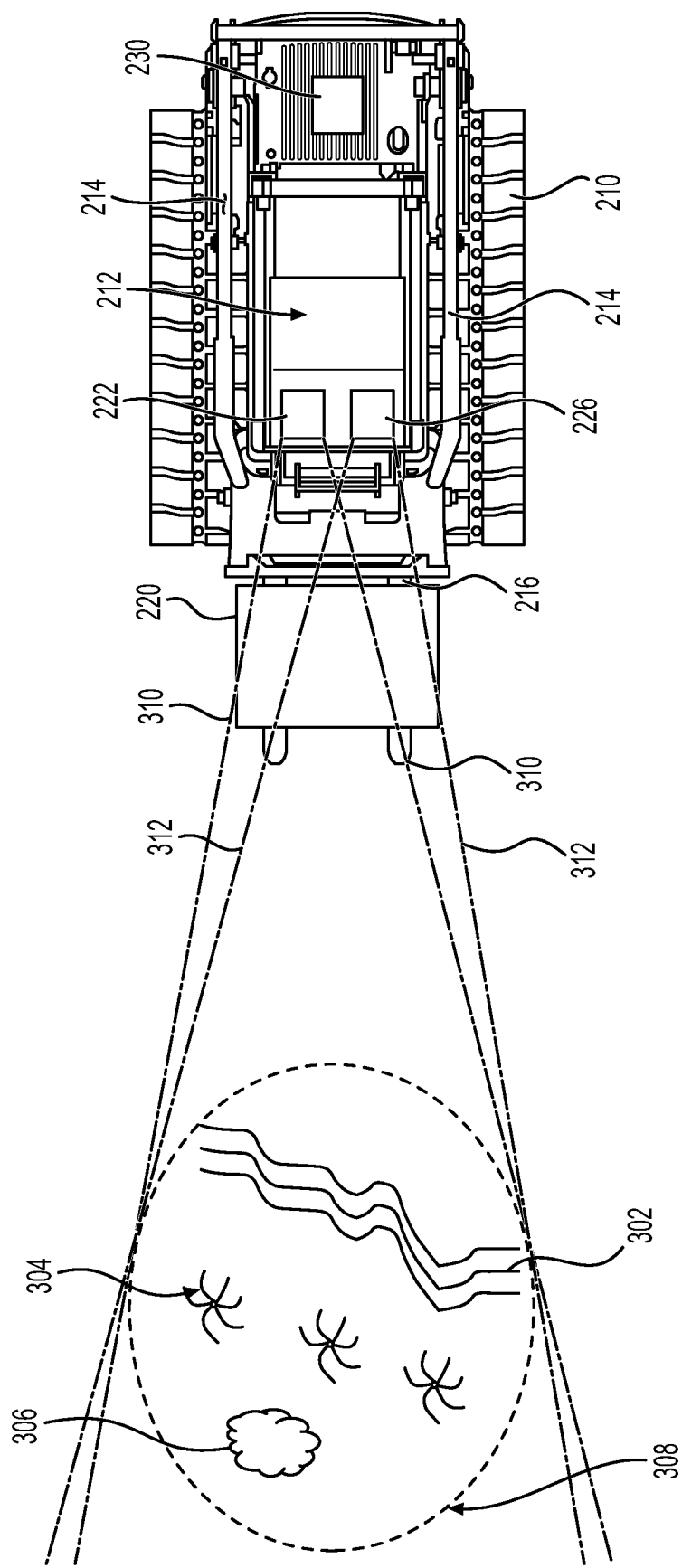
FIG. 3 is a top view of the semi-autonomous work machine of FIG. 2 approaching a destination drop site in accordance with an example of the present disclosure.

Discussed in more detail for FIGS. 2 and 3, machines 104 can be vehicles or other mobile machines that have engines, motors, drivetrains, braking systems, hydraulic components, and/or other mechanisms that can cause movement of wheels of the machines, movement of work tools and/or other elements of the machines, and/or otherwise implement operations of the machines. In some examples, one or more of the machines 104 can be fuel-powered machines that operate based on power provided by internal combustion engines and/or other elements that consume fuel. In other examples, one or more of the machines 104 can be battery electric machines (BEMs), battery electric vehicles (BEVs), hybrid vehicles, fuel cell and battery hybrid vehicles, or other mobile machines. For instance, machines 104 can have batteries, such as lithium-ion (Li ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries that can at least partially power the machines 104.

Machines 104 can be semi-autonomous machines or fully autonomous machines that operate automatically based on machine instructions 112 generated by the computing system 102 or another computing system. For example, a machine can have an electronic control module (ECM) 122 and/or other on-board computing devices that can fully or partially control operations of the machine, such as steering, speed adjustments, work tool movements, and/or other operations. Accordingly, operations of a machine can be fully or partially controlled, automatically or semi-automatically, by on-board controllers such as the ECM 122, and/or off-board controllers such as the computing system 102. A machine can, for instance, have an on-board guidance system that can drive the machine autonomously, an obstacle detection system that assists the on board guidance system or can alert a human operator of nearby objects detected by the obstacle detection system, and/or other systems that fully or partially control operations of the machine. As another example, the computing system 102 or another off-board computing device can receive data from a machine and return machine instructions 112 to machine 104 to dispatch the machine to autonomously travel along a defined and/or assigned route, or to fully or partially control operations of the machine remotely.

Machines 104 can also include sensors 124, such as cameras, LIDAR sensors, RADAR sensors, other optical sensors or perception systems, Global Positioning System (GPS) sensors, other location and/or positioning sensors, work tool position sensors, hydraulic pressure sensors, payload sensors, speed sensors, brake temperature sensors, other temperature sensors, tire pressure sensors, battery state of health (SoH) sensors, fuel sensors, incline and decline travel sensors, and/or other types of sensors. Sensors 124 of a machine can be operable coupled to the ECM 122 and/or other on-board computing systems of the machine. Sensors 124 can also provide corresponding sensor data to the ECM 122 and/or other on-board computing systems of the machine, and/or off-board computing systems such as computing system 102, such that the sensor data can be used to determine a location of the machine, detect nearby terrain, detect nearby objects, such as vehicles, other machines, or personnel, detect the positions of such nearby objects relative to the machine, determine a weight of a payload carried by the machine, determine a state of charge (SoC) of a battery system, determine an amount of fuel carried by the machine, and/or perform other operations. In some examples, data provided by sensors 124 of a machine can enable the ECM 122 of the machine to cause the machine to drive and/or operate autonomously or semi-autonomously.

Machines 104 can have wireless communication interfaces 126 that are operably coupled to the ECMs 122 of the machines 104, and that allow the ECMs of the machines 104 to send data to computing system 102 and/or other off-board controllers, and to receive machine instructions 120 and other data from the computing system 102 and/or other off-board controllers. Such wireless communication interfaces 126 can include cellular interfaces, modems, receivers, transmitters, antennas, and/or other hardware or software elements configured to send and receive data, for instance to exchange data with computing system 102 and/or other off-board controllers. Computing system 102 and/or other off-board controllers can have, or be associated with, similar wireless communication interfaces, such that computing system 102 and/or other off-board controllers can wirelessly exchange data with ECMs 122 and/or other on-board computing systems of the machines 104.

While FIG. 1 provides context for the operation of machines 104, FIGS. 2 and 3 together illustrate a semi-autonomous compact track loader (SACTL) as one example of a machine 204 within the machines 104. FIG. 2 is a side view and functional block diagram 200 of machine 204. As shown, machine 204 includes a chassis 206 to which is coupled a power source 208 configured to supply power for operation of machine 204, including, for example, operating work implements, electronics, and steering, and/or for supplying torque to drive members to propel machine 204 across one or more paths 130. For example, machine 204 shown in FIG. 1 includes traction devices in the form of a pair of tracks 210 coupled to the chassis 206 and configured to propel machine 204 across paths 130. Alternatively, machine 204 could include one or more wheels instead of, or in addition to, tracks 210. The example machine 204 also includes a cab 212 coupled to chassis 206 for protecting and/or providing comfort for an operator of machine 204 and/or for protecting control-related devices of machine 204. In some examples, machine 204 may be fully autonomous and able to operate without an onboard or remote human operator.

Machine 204 may be fitted with a variety of work implements well known in the field, such as a blade, a broom, a shovel, or a plow, for manipulation by arms 214. In the example of FIG. 2, machine 204 includes a pair of forks 214 attached to arms 216. Forks 216 enable machine 204 to function as a forklift, sliding under and lifting material for transportation between staging area 128 and one or more drop points 108. Referring to FIG. 2, forks 216 are depicted under a pallet 218 on which a payload, such as cargo 220, rests. In one example, cargo 220 may be solar panels, solar panel installation equipment, and/or other materials for distribution within worksite 106. It will be understood that pallet 218 is optional for transporting cargo 220, and forks 216 may be used to lift, transport, and drop cargo 220 without use of pallet 218.

Among sensors 124 depicted in FIG. 1 for machines 104, machine 204 includes at least one image sensor 222. Image sensor 222 is configured to sense, determine, and/or collect environmental information relating to visual images in one or more perspectives about machine 204 as image data 224 and to generate one or more image signals that include or indicate this environmental image data 224. Image sensor 222 may be any known type of analogue or digital image sensor, digital camera, and/or digital video camera. For example, image sensor 222 may be a high dynamic range (HDR) camera, a light-sensitive camera, and/or an ultrasonic camera. Other suitable types of imagers are contemplated. Image sensor 222 captures still or moving image data 224 suitable for use by machine 204 discussed below. In some examples, image sensor 222 provides two-dimensional image data, three-dimensional image data, image sequences, gray image data, and/or color image data. In some examples, image sensor 222 provides depth data, absorption data, and/or reflectance data.

Also among sensors 124 for machines 104, machine 204 includes at least one range sensor 226. Range sensor 226 is configured to sense, determine, and/or collect environmental information relating to depths and/or ranges of objects in one or more perspectives about machine 204 as range data 228. Further, range sensor 226 generates one or more range signals that include or indicate this range data 228. Range data 228 may be used for detecting objects and land forms in the environment about machine 204. For example, range sensor 226 may be a machine "vision" device used in machine navigation, obstacle detection and avoidance, collision detection and avoidance, site mapping, material excavation or extraction, and/or applications. Accordingly, range sensor 102 may be a device configured to determine the range and direction from range sensor 226 to points on a surface within a field of view of range sensor 226. In some examples, as discussed further below, range sensor 226 collects range data 228 regarding the contour of terrain in front of forks 216 in the direction of forward travel for machine 204 for generation of a terrain map. In one example, range sensor 226 includes or is part of a Light Detection and Ranging (LIDAR) device. In another example, range sensor 226 includes or is part of stereo cameras configured for providing depth assessment.

When implemented as a LIDAR unit, range sensor 226 may include a plurality of light sources, such as lasers. Each laser generates a laser beam which is directed at various points of worksite 106. In this example, range sensor 226 further includes one or more detector devices that receive the laser beams after reflection off of various points of worksite 106. Based on the time between generating the laser beam and receiving the reflected laser beam, range data 228 determines a distance to the corresponding point. As a result, range sensor 226 and additional processing discussed below will generate a 3D point cloud image or grid map representative of a part of worksite 106 that is detected by the LIDAR unit and is part of range data 228.

Also among sensors 124 for machines 104, machine 204 includes at least one inertial sensor 230 and one or more proprioceptive sensors (not shown). The at least one inertial sensor 230 is configured to detect changes in position and orientation during movement of machine 204 as inertial data 232. In some examples, inertial data 232 arises from an inertial sensor 230 that includes three orthogonally oriented accelerometers for detecting changes along an X-axis, Y-axis, or Z-axis, and three orthogonally oriented gyroscopes for detecting changes in pitch rate, yaw rate, and roll rate during movement of machine 204. In other examples, inertial sensor 230 also includes three orthogonally oriented magnetometers serving as a three-dimensional electronic compass and/or a two-axis inclinometer to provide pitch angle and roll angle. Inertial sensor 230 is typically part of an inertial measurement unit (IMU) within machine 204. The one or more proprioceptive sensors detect the linear movement of machine 204, such as the speed of tracks 210 (or wheels), which may be used to determine the velocity of machine 204.

As also shown in FIG. 2, functional block diagram 200 for machine 204 includes a terrain verification system 234 for evaluating the quality of terrain within one of the drop points 108 in which cargo 220 is to be deposited. Cargo 220 often requires that the surface on which it is deposited by machine 204 is relatively level and flat. In some examples, cargo 220 may include electronic equipment, glass panels, or other material subject to breakage, and depositing cargo 220 within one of drop points 108 that is uneven or contains obstructions can damage cargo 220 or lead to installation or usage problems. Moreover, unevenness could cause forks 216 to drag or catch on the ground and disrupt a proper delivery. While the relevant drop point may have been prepared or graded previously, when the drop point is outdoors, weather or other factors may have deteriorated the condition of the land surface. For instance, rain may have created ruts at the intended drop point, vehicle tracks may have caused an unevenness to the surface, or rocks may be present. Further, grass, bushes, or other vegetation may have grown at the location. Terrain verification system 206 enables machine 204 to determine independently through sensor collection and computer processing whether the land surface of the intended one of drop points 108 for cargo 220 is within an acceptable condition for delivery.

Terrain verification system 234, which is illustrated in FIG. 2 as a functional block for machine 204, is a system within the work machine for receiving image data 224, range data 228, and inertial data 232 from image sensor 222, range sensor 226, and inertial sensor 230, respectively, and evaluating the sufficiency of the topology at one of the drop sites 108 for delivering a payload. Described in FIG. 2 and this disclosure with respect to functional blocks, terrain verification system may be incorporated as hardware, software, or a combination of hardware and software within control electronics of machine 204. For instance, in one implementation, terrain verification system 234 may be embodied within hardware in the form of a supplemental ECM, configured to execute computer code to perform the detection, analysis, and instructions relating to verifying the terrain at one of the drop sites 108. In this example, the supplemental ECM (not shown) would interface with existing ECM 122 as well as with appropriate detection modules within machine 204, such as image sensor 222, range sensor 226, and inertial sensor 230 to help coordinate the activities for verifying the suitability of terrain for dropping cargo 220 at one of the drop sites 108 consistent with the following discussion.

In one example, terrain verification system 234 evaluates the sufficiency of a land surface at one of the drop sites 108 for delivering a payload based on the roughness of the surface. "Roughness" in this context generally refers to a degree in which the surface at the drop point deviates from a flat plane. The deviation may arise from erosion or other forces causing troughs or other gaps within the land surface at the drop point. Or the deviation may arise from sporadic accumulation of land above the surface in the form of mounds or rocks. Similarly, the deviation from a flat plane may arise from a slope leading to an overall unlevel surface. The degree or quantification of roughness will depend on the implementation and is within the discretion of those of ordinary skill in the art.

Among other functions, terrain verification system 234 stores a predetermined roughness threshold 236 in a memory of machine 204. Roughness threshold 236 operates as a base line value of a maximum roughness, i.e., deviation from a flat plane, acceptable for the surface at a drop point for delivery of cargo 220. Roughness threshold 236 may take any form suitable to the implementation, but in one example roughness threshold 236 is a numerical or mathematical representation calculated through statistical methods or modeling of a variety of landscapes and taking into account the characteristics of cargo 220 to be dropped.

Factors affecting a value for roughness threshold 236 may include a slope amount and direction of the surface at a drop point, a variation in the surface from a plane due to mounds or troughs, and the presence of obstructions such as rocks or vegetation. In some examples, roughness threshold 236 is previously calculated from test runs or modeling and, as mentioned, may take into account the type of material for cargo 220 and its sensitivity to breakage and the characteristics of machine 204 and its forks 216. As discussed below, roughness threshold 236 serves as a benchmark or base line in evaluating the condition of one of the drop sites 108 for smoothness sufficient to effectively and safely carry out the delivery of specific cargo 220. In general, a higher value for roughness threshold 236 indicates a rougher terrain, i.e., a surface with greater deviation compared with a flat plane, although in other implementations a higher value could alternatively designate a smoother terrain.

Referring to FIG. 3, context for terrain verification system 234 is shown for a drop approach 300 for machine 204. FIG.

3 is a top view of machine 204 with cargo 220 approaching a destination 308 consistent with the principles of the present disclosure. In some examples, destination 308 is one of the drop points 108 in FIG. 1 provided in machine instructions 112 for machine 204 to deliver cargo 220 from staging area 128 after traversing one or more of paths 130. As illustrated in FIG. 3, destination 308 is in front of forks 216 in a direction of forward travel for machine 204. In this position, with machine 204 either stationary or moving toward destination 308, image sensor 222 may receive image information 310 and range sensor 226 may receive range information 312 within a zone including destination 308. Image information 310 and range information 312 may be collected simultaneously or separately as desired for the intended implementation.

Within destination 308 in FIG. 3, several potential anomalies to a level and smooth surface for cargo 220 are shown. For example, destination 308 may include uneven ground 302 possibly due to erosion from weather forming ruts or valleys within dirt. In other situations, uneven ground 302 is caused by elevated portions of earth such as from mounds of dirt above the surface. Also illustrated in FIG. 3, destination 308 has vegetation in the form of grass 304 and bushes 306 that have grown. As discussed below, terrain verification system 234 takes into account and evaluates the presence of uneven ground 302, grass and similar light vegetation 304, and bushes and similar heavy vegetation 306, as well as any other obstacles to a level surface such as rocks or debris, as machine 204 approaches destination 308.

To accomplish the evaluation of destination 308, terrain verification system 234 includes a terrain mapper 238 configured to prepare a map of the terrain at destination 308, as indicated in FIG. 2. Typically implemented as software routines such as within ECM 122, a supplemental ECM (not shown), or other computing electronics in machine 204, terrain mapper 238 assesses depth or range data 228 collected on machine 204 for destination 308 to generate a representation of the land surface at that location. For example, as machine 204 approaches destination 308 to deliver cargo 220, range sensor 226 in the form of a LIDAR unit will generate laser beams as range information 312 across the surface of destination 308 and receive reflected laser beams in response, which are processed as part of depth or range data 228. In some examples, terrain mapper 238 filters out obstacles detected in the environment, such as piles, vehicles, construction debris, personnel, etc., from range data 228. The resulting range data 228 will then represent the landscape of the ground, which may be processed for a ground map. Based in part on the time differences between the transmitted and received beams, terrain mapper 238 can determine distances from a reflected object, e.g., uneven ground 302. As the reflected beams are accumulated, terrain mapper 238 generates a 3D point cloud image, a grid map, or other representation of the surface of destination 308, in a manner known to those of ordinary skill in the field.

In some examples, terrain verification system 234 processes the results of the ground map generated by terrain mapper 238 via a roughness processor 243. Roughness processor 243 is a functional component of terrain verification system 234 that may be implemented within hardware, such as ECM 122, a supplemental ECM, or other computer electronics within machine 204, or software executing on that hardware. Analyzing the ground map generated by terrain mapper 238, roughness processor 243 in general analyzes range data 228 from range sensor 226 to evaluate the condition of the surface at destination 308. Roughness processor 243 calculates a roughness metric 244 as any mathematical assessment to quantify a roughness of destination 308 in terms of the slope, evenness, smoothness, and flatness of the surface. In some examples, a slope value for the surface may be assessed separately from surface roughness or smoothness rather than embedded within roughness metric 244. In some examples, roughness processor 243 calculates roughness metric 244 based on a variance of sensor points within range data 228 collected by a LIDAR or stereo cameras (i.e., range sensor 226) along a vector normal to the ground surface as part of a terrain mapping system. In some examples, roughness metric 244 extends from a low value commensurate with the surface being planar and flat without slope or obstructions to a high value commensurate with the surface being highly disturbed with a steep slope or with large obstructions. The parameters for roughness metric 244 may vary based on the particular implementation and are within the knowledge and experimentation of those skilled in the field.

As also indicated in FIG. 2, in some examples, terrain verification system 234 includes an obstruction detector 240 configured to locate any obstructions for forks 216 and cargo 220 within destination 308. Obstruction detector 240 includes image sensor 222, possibly in coordination with range sensor 226, and associated electronics and software within terrain verification system 234 for processing at least the received image data 224. As machine 204 approaches destination 308 to deliver cargo 220 image sensor 222 will capture image information 310 indicative of image data 224 of the topology of destination 308, either simultaneously with range sensor 226 or separately. Obstruction detector 240 will process image data 224 to determine whether any obstacles exist on or above the surface of destination 308. The obstacles may include, for instance, light vegetation 304, heavy vegetation 306, or other structures such as rocks or debris. In some examples, obstruction detector 240 processes image data 224 using known image analysis techniques (e.g., known digital analysis techniques), such as by analyzing gradients in the image data 224 to identify obstacles. Deep learning, or machine learning based on artificial neural networks, may also be employed to improve or assist with the image analysis in identifying obstacles, as may other techniques known to those of ordinary skill in the field.

In some examples, components within terrain verification system 234, such as roughness processor 243, process the results of the image processing for image data 224 by obstruction detector 240 as a check on the validity of roughness metric 244 as calculated from range data 228 from range sensor 226. Thus, to the extent range sensor 226 contributes to a map of the terrain generated by terrain mapper 238 that leads to a high value for roughness metric 244, terrain verification system 234 can use obstruction detector 240 to confirm whether roughness metric 244 is valid or accurate. For instance, obstruction detector 240 may indicate the presence of debris at destination 308, which may detract from confidence in range data 228 as an indication of ground roughness. Terrain verification system 234 may then take alternative steps to assess ground roughness and roughness metric 224 determined from range data 228 as discussed below.

In other examples, components within terrain verification system 234, such as roughness processor 243, process the results of the image processing for image data 224 by obstruction detector 240 as part of calculating roughness metric 244. Accordingly, in addition to or independent of the ground map processed by terrain mapper 238, roughness metric 244 in some examples considers results from obstruction detector 240 with respect to visually detectable information received by image sensor 222. In some examples, image data 224 will influence roughness metric 244 to a higher value when terrain verification system 234 detects one or more obstacles at destination 308 and will not affect roughness metric 244 when no obstructions are detected, although the parameters for roughness metric 244 may vary based on the particular implementation.

Terrain verification system 234 also includes a localization system 242, as shown in FIG. 2. Localization system 242 is configured to evaluate position and orientation in space of machine 204. Localization system 242 includes, among other things, one or more components including an IMU that detects inertial data 232 indicative of changes in orientation of machine 204 as tracks 210 move machine 204. Additionally, localization system 242 may include proprioceptive sensors to detect the speed of tracks 210, which may be used to determine the velocity of machine 204. In particular, three orthogonally oriented gyroscopes in an example for inertial sensor 230 provide inertial data 232 including the pitch rate, yaw rate, and roll rate of machine 204. Accordingly, if machine 204 were to traverse the surface of destination 308, proprioceptive sensors (not shown) and inertial sensor 230 would provide movement data and inertial data 232 representing the position and orientation of machine 204 including its shifting away from a level condition. Thus, as machine 204 moves over land having deep ruts or heavy debris, localization system 242 will indicate variations in inertial data 232, such as changes in pitch and roll, representative of a highly uneven surface beneath tracks 210.

In some examples and situations, terrain verification system 234, such as roughness processor 243, takes into account the results of machine movement from localization system 242 in calculating roughness metric 244. An indication by localization system 242 that the pitch or roll of machine 204, for example, has changed appreciably while machine 204 traverses destination 308, may cause terrain verification system 234 to increase roughness metric 244 by a relative amount. In other situations, where little or no change occurs to the pitch or roll of machine 204, terrain verification system 234 may not affect or may decrease roughness metric 244, as exemplified below, although the parameters for roughness metric 244 may vary based on the particular implementation.

Consistent with the principles of the present disclosure, terrain verification system 234 considers one or more of image data 224, range data 228, and inertial data 232 in determining the condition of the surface at destination 308, such as by influencing a value for roughness metric 244 by roughness processor 243. Terrain verification system 234 may use the results from one or more of terrain mapper 238, obstruction detector 240, and localization system 242 to verify or cross-check the results from others of terrain mapper 238, obstruction detector 240, and localization system 242. In one example, if the results from terrain mapper 238 leads to an increment for roughness metric 244 by roughness processor 243 due to uneven topology detected through a ground map for destination 308, terrain verification system 234 may consider results from obstruction detector 240 as a check on the results derived from range data 228. Thus, a conclusion from obstruction detector 240 that an obstruction exists in destination 308 would supplement or confirm the result from terrain mapper 238 based on range data 228 of an uneven topology, i.e., a high value for roughness metric 244. Further, in some examples, following a high roughness metric 244 based on input from terrain mapper 238 and obstruction detector 240, terrain verification system 234 causes machine 204 to traverse destination 308 to collect inertial data 232 relevant to the ground surface. If inertial data 232 and image data 224 both indicate that obstructions within destination 308 are light vegetation 304, i.e., obstructions appearing within image data 224 but not affecting pitch or roll of machine 204 in inertial data 232, then terrain verification system 234 may conclude that cargo 220 may be safely deposited at destination. As a result, terrain verification system 234 via roughness processor 243 will decrease roughness metric 224 from its initial value derived from range data 228 sufficiently to permit a release of cargo 220 at destination 308. Other combinations of evaluating image data 224, range data 228, and inertial data 232 are possible, some of which are addressed in more detail in FIGS. 4 and 5 below.

Following calculation and adjustment of roughness metric 244 based on input from one or more of terrain mapper 238, obstruction detector 240, and localization system 242, roughness processor 243 can compare roughness metric 244 to roughness threshold 236. In some examples, if roughness metric 244 is below roughness threshold 236, terrain verification system 234 will allow, or not intervene during, the execution of the drop for cargo 220 at destination 308. In other examples, if roughness metric 244 is equal to or above roughness threshold 236, terrain verification system 234 will interrupt the delivery to protect cargo 220 from potential damage.

As depicted in FIG. 2, terrain verification system 234 is configured to communicate with output device 250. If terrain verification system 234 concludes that either image data 224 or range data 228 needs to be verified with inertial data 232, for example, terrain verification system 234 can provide input to ECM 122, for instance, within output device 250 to cause tracks 210 to traverse machine 204 over destination 308. Similarly, if terrain verification system 234 concludes that the terrain at destination 308 is sufficient for cargo 220, terrain verification system 234 can instruct ECM 122 to complete that mission as provided by machine instructions 112. On the other hand, if roughness processor 243 concludes that the terrain at destination 308 is not sufficient for cargo 220, terrain verification system 234 can interrupt the mission provided by machine instructions 112 and cause output device 250 to communicate via wireless communication interfaces 126 with computing system 102 for further instructions. For semi-autonomous operation, such as with machine 204, output device 250 may alert an operator of the incomplete end of the mission due to the condition of destination 308.

In some examples, terrain verification system 234, including terrain mapper 238, obstruction detector 240, and localization system 242, is implemented in a variety of electronics and software, whether embedded within hardware or separately stored in memory on machine 204. For instance, terrain verification system may include one or more controllers, one or more processors, a memory, and/or other components with respect to machine 204. The controllers may include an electronic control unit, such as ECM 122, a central control module (CCM), a central timing module (CTM), a general electronic module (GEM), a control unit, and/or any other types of ECUs. Other forms of implementation are within the knowledge of those skilled in the art and are not intended to be limiting to the functional operations described in this disclosure.

Figure 4:
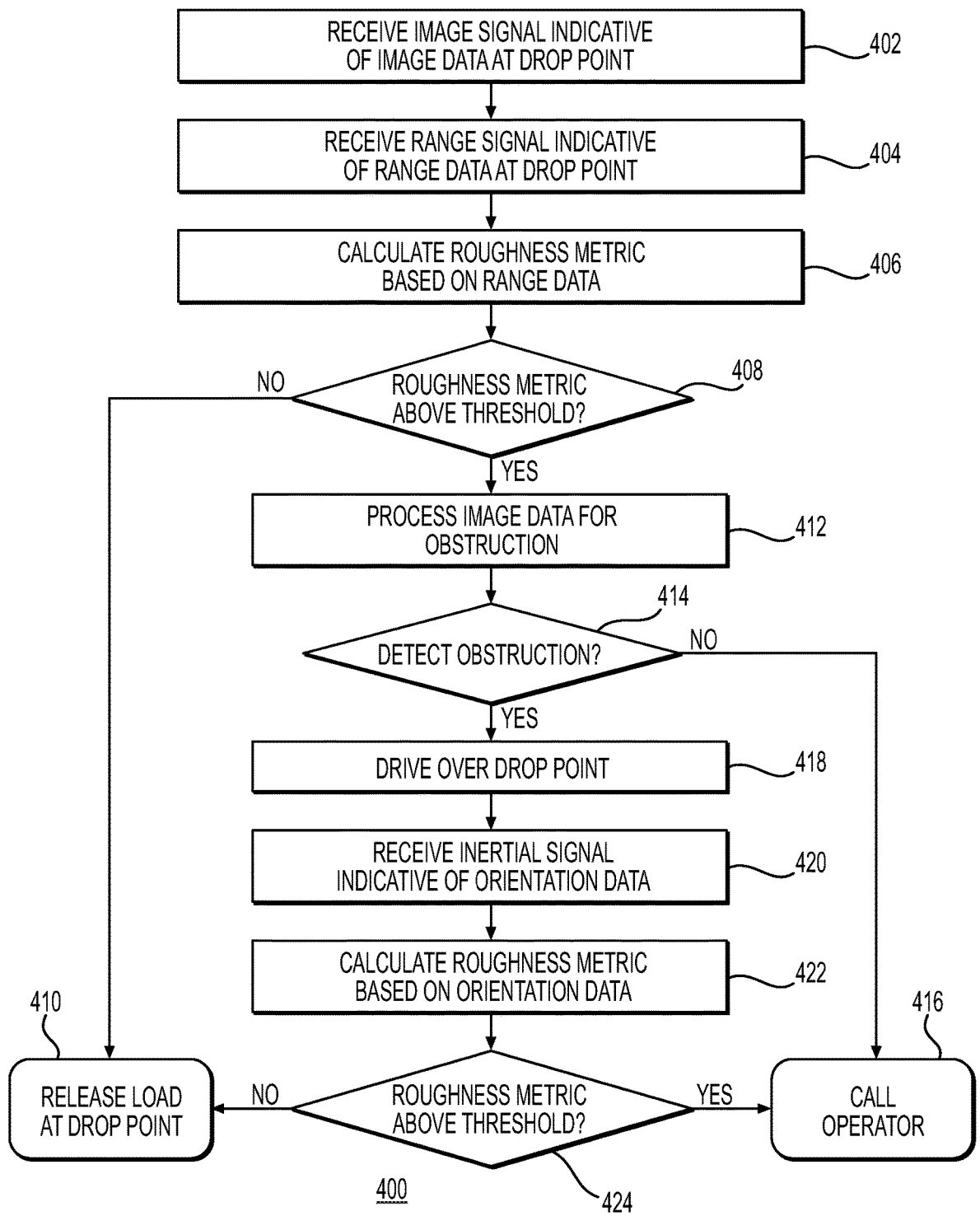
FIG. 4 is a flowchart of a first method of verifying terrain at a destination for delivering cargo in accordance with one example of the present disclosure.

Turning from the architecture of machine 204 and terrain verification system 234 as illustrated in FIGS. 2 and 3 to a method involving that architecture, FIG. 4 is a flowchart of a representative method 400 for verifying terrain at a destination 308 for delivering cargo 220 in an example environment, such as a worksite 106. This process 400 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

In FIG. 4, the example process 400, at 402, includes processing equipment, or other electronic controller or processor on a work machine associated with a terrain verification system, receiving an image signal indicative of image data at a drop point. As shown in FIG. 2, image sensor 222 positioned on machine 204 captures image information 310 indicative of image data 224 for a drop point, such as destination 308, which is then provided as an image signal to the controller or processor, such as roughness processor 243. In some examples, machine 204 captures the image information 310 as machine 204 approaches destination 308 on a mission to deposit cargo 220. The one or more image signals may be communicated to the processing equipment, such as roughness processor 243, via a hardwired and/or wireless link for evaluation.

In a second step 404 in FIG. 4, the processing equipment receives a range signal indicative of depth or range data at the drop point. In one example, range sensor 226, which may be part of or include LIDAR equipment or stereo cameras as examples, is positioned on machine 204 and receives range information 312 indicative of range data 228 for the drop point, i.e., destination 308. In some examples, machine 204 captures the range information 312 as machine 204 approaches destination 308 on a mission to deposit cargo 220. The one or more range signals may be communicated to the processing equipment, such as roughness processor 243, via a hard-wired and/or wireless link for evaluation.

Step 406 of the method includes the processing equipment calculating a roughness metric based on the range data. In one example, terrain verification system 234 within machine 204 evaluates the content of range data 228 using a terrain mapper 238 to generate a ground map of the earth surface at destination 308. As discussed above, in one aspect of that activity, terrain mapper 238 may filter out obstacles detected in the environment to yield range data representing only the landscape of the earth surface at destination 308. Based on this range data 228 and mapping, terrain verification system 234 via roughness processor 243 may prepare or adjust a roughness metric 244 representative of a perceived topology at destination 308. In more detail, roughness processor 243 may calculate roughness metric 244 based on a variance of sensor points within range data 228 collected along a vector normal to the ground surface as part of the ground map from terrain mapper 238. If the ground map indicates a surface of varying height, depth, or slope, roughness metric 244 may be increased in value or otherwise adjusted according to the particular implementation.

In step 408 of method 400, a determination is made whether the roughness metric is above a threshold. As discussed above, a threshold, such as roughness threshold 236 is predetermined in some examples and stored within machine 204. Whether a numerical value or a more complicated mathematical representation of surface condition, roughness metric 244 may be compared with roughness threshold 236 to determine which is greater. If roughness metric 244 is less than roughness threshold 236, then the evaluation of terrain from range data 228 indicates that the surface is within a predetermined acceptable level of smoothness for dropping cargo 220. As a result (Step 408—No), the method proceeds to step 410 in FIG. 4, where the cargo may be released at the drop point, i.e., destination 308. But if roughness metric 244 is greater than or equal to roughness threshold 236, then the evaluation of terrain from range data 228 indicates that the surface is not within an acceptable level of smoothness for dropping cargo 220 (Step 408—Yes), and method 400 proceeds to step 412 for further processing.

As depicted in FIG. 4, step 412 entails the processing equipment evaluating image data for evidence of an obstruction. In one example discussed above, image data 224 captured by image sensor 222 may be evaluated by obstruction detector 240 through image processing techniques to locate one or more obstructions on the surface of destination 308. These obstructions may take any form, such as light vegetation 304, heavy vegetation 306, rocks, or other debris. If an obstruction is not identified, method 400 at step 414 (Step: 414—No) interrupts its mission of delivering cargo 220 and at step 416 alerts an operator for guidance. In this instance, a conclusion is reached that range data 228, such as of uneven ground 302 from LIDAR equipment, accurately reflects the surface conditions at destination 308, which are not of sufficient quality for delivery of cargo 220.

On the other hand, if the analysis of image data 224 does identify an obstruction in method step 414 (Step: 414—Yes), terrain verification system 234 in some examples determines that a high value for roughness metric 244 may be caused by surface debris. Particularly if surface debris is in the form of light vegetation 304 or even heavy vegetation 306, a LIDAR system as part of range sensor 226 and terrain mapper 238 may provide data leading to the conclusion by roughness processor 243 that a surface is unacceptably rough although the debris may not be an impediment to safe delivery of cargo 220.

Therefore, following a positive detection of an obstruction in step 414 (Step: 414—Yes), processing equipment causes the machine to drive over the drop point in step 418 and to receive inertial signals indicative of orientation data in step 420. As discussed above, terrain verification system 234 in some examples causes machine 204 to drive over destination 308, during which inertial data 232, or orientation data, such as pitch and roll of machine 204 is collected. It will be appreciated that if debris located in step 414 has a high degree of deformability, such as due to having a low mass or density, as with light vegetation 304 or certain types of heavy vegetation 306, tracks 210 of machine 204 will roll over the debris and cause the debris to be crushed or otherwise deformed. As a result, machine 204 will not register significant changes in inertial data 232 due to the deformation of the debris and the comparatively high weight of machine 204. On the other hand, if debris identified in step 414 has a low degree of deformability, such as due to having a high mass or rigidity and being elevated the ground surface, as with rocks or logs, tracks 210 and the weight of machine 204 will not crush or otherwise deform the debris. Consequently, machine 204 will register changes in its orientation while moving over destination 308, which will be reflected in movement data and inertial data 232 as detected by localization system 242.

Following receipt of inertial signals, method 400 in FIG. 4 proceeds to step 422 where processing equipment again calculates the roughness metric based on the orientation data. As noted above, if debris on the ground surface has a low deformation capacity, machine 204 may experience a change in pitch or roll when traversing destination 308. In this situation, roughness processor 243 will process orientation data or inertial data 232 from localization system 242 and increase roughness metric 244 accordingly. An amount of change to the orientation of machine 204 while traversing destination 308 justifying a change in roughness metric 244 will depend on the particular implementation, including the type of cargo 220 and other factors, and may be determined by the ordinarily skilled artisan. On the other hand, if machine 204 does not experience a significant change in pitch or roll during the traversing, then roughness processor 243 within terrain verification system 234 may decrease roughness metric 244 or keep roughness metric 244 unchanged depending on the circumstances.

As indicated in FIG. 4, after step 422, processing equipment such as roughness processor 243 compares roughness metric 244 to roughness threshold 236 again at step 424. If, following additional data from obstruction detector 240, roughness metric 244 is still equal to or above roughness threshold 236 (Step 424—Yes), method 400 moves to step 416 where the processing equipment causes an alert to be sent to an operator and to stop the delivery mission. In this situation, it will be evident that the surface debris identified by obstruction detector 240 (and perhaps in addition to soil unevenness identified by terrain mapper 238) is an impediment to the safe delivery of cargo 220. If, following additional data from obstruction detector 240 and localization system 242, roughness metric 244 is now below roughness threshold 236 (Step 424—No), method 400 moves to step 410 where processing equipment will cause cargo 220 to be released at destination 308. In this situation, it will be evident that roughness processor 243, in coordination with at least obstruction detector 240 and localization system 242, concluded that the surface that terrain mapper 238 identified as not a flat plane is of low concern with respect to the delivery of cargo 220 at destination 308. For example, light vegetation 304 within destination 308 may initially lead to a high roughness metric 244 based on range data 228, but further analysis using image data 224 and inertial data 232 may result in a lower roughness metric 244 indicating that destination 308 is suitable for dropping pallet 218. Otherwise, if following analysis image data 224 and inertial data 232 from obstruction detector 240 and localization system 242, roughness metric 244 is above roughness threshold 236 (Step 424—Yes), method 400 moves to step 416 where an operator is alerted for guidance.

Figure 5:
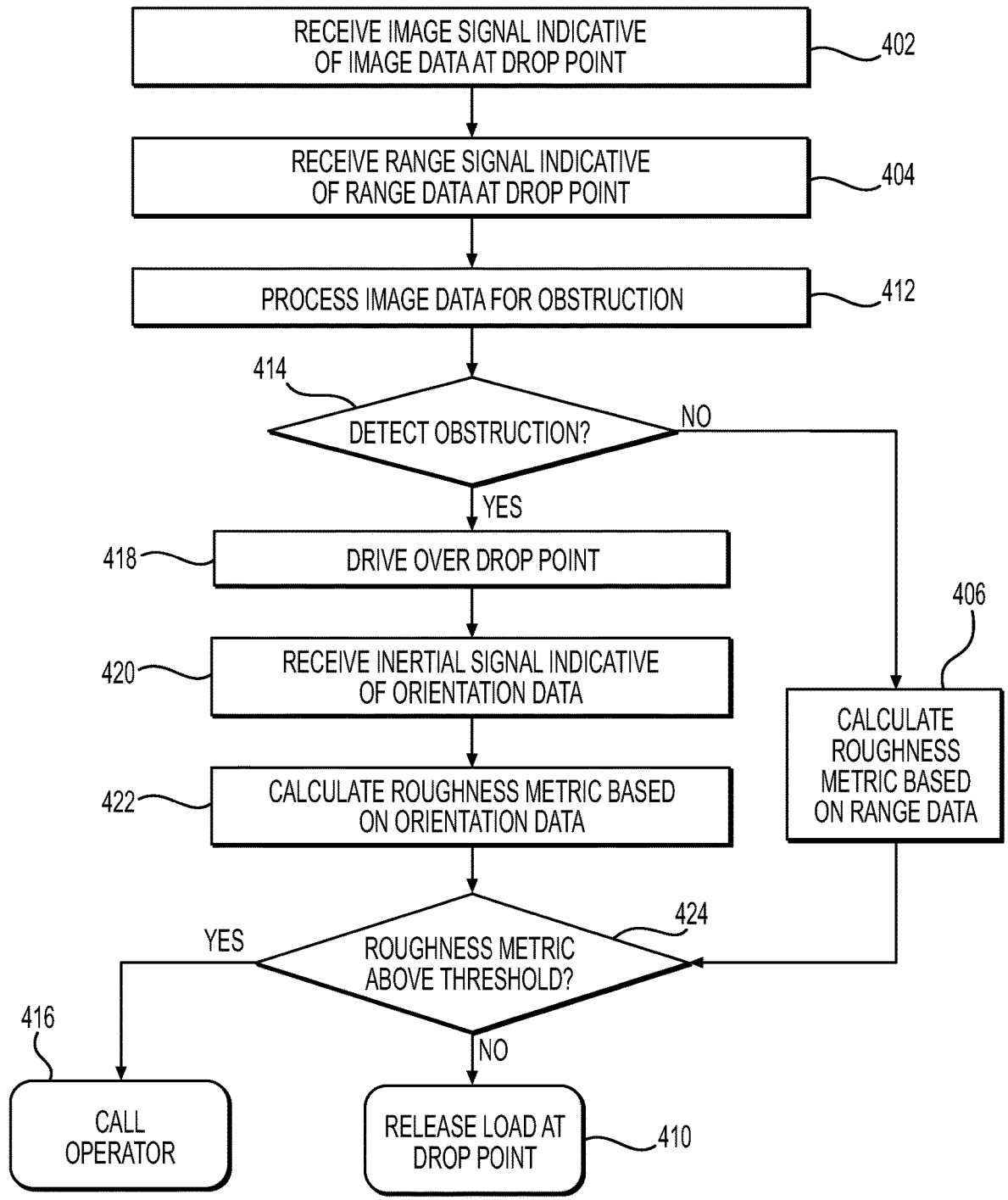
FIG. 5 is a flowchart of a second method of verifying terrain at a destination for delivering cargo in accordance with another example of the present disclosure.

FIG. 5 illustrates a flowchart of another representative method 500 for verifying terrain at a destination 308 for delivering cargo 220 in an example environment, such as a worksite 106. Method 500 includes many of the same steps as method 400 but in a different sequence. As a result, the following does not repeat the explanation of those steps but explains the difference in sequence.

As indicated in FIG. 5, an alternative method 500 includes the same opening steps 402 and 404 as in method 400 of processing equipment receiving image signals and receiving range signals. Following this receipt, in method 500 the processing equipment evaluates image data for evidence of an obstruction in step 412 and a decision is made whether an obstruction is detected in step 414. Thus, different than method 400, exemplary method 500 first investigates whether visual evidence via image data 224 exists to show an obstruction on the surface of destination 308. Method 500 takes one of two paths depending on whether evidence of an obstruction is found from image data 224 in step 414.

If an obstruction is located in image data 224 in step 414, the processing equipment causes machine 204 to drive over the drop point at destination 308 (step 418) to receive inertial signals indicative of orientation data, or inertial data 232 (step 420). Thereafter, in step 422, roughness processor 243 calculates or updates roughness metric 244 based on the inertial data 232. As discussed above, if the pitch or roll of machine 204 is substantial as determined for the particular implementation, then roughness processor 243 may increase roughness metric 244.

On the other hand, if an obstruction is not located in image data 224 in step 414, terrain verification system 234 will calculate or update roughness metric 244 via roughness processor 243 based on LIDAR or range data 228 in step 406. In one example, terrain verification system 234 will conclude from the lack of obstruction from visual evidence that any impediment to safe delivery of cargo 220 would arise from topological anomalies to the soil at destination 308. Using range data 228 from terrain mapper 238, terrain verification system 234 can increase or decrease roughness metric 244 accordingly.

As shown in FIG. 5, in step 424 of method 500, roughness processor 243 compares roughness metric 244 with roughness threshold 236. Roughness metric 244 at this stage may be calculated based on previous step 406 or previous step 422. If roughness metric 244 meets or exceeds roughness threshold 236, roughness processor 243 may deem the surface of destination 308 unsatisfactory and, at step 416, machine 204 calls an operator for assistance. If roughness metric 244 is below roughness threshold 236, roughness processor 243 may deem the surface of destination 308 satisfactory to receive cargo 220 and, at step 410, causes machine 204 to deposit cargo 220 on the surface of destination 308.

Those of ordinary skill in the field will appreciate that the principles of this disclosure are not limited to the specific examples discussed or illustrated in the figures. For example, while verification of terrain has been discussed in the context of dropping cargo at a destination site in a worksite, other uses for the process are feasible. The processes could be implemented to evaluate whether a path is sufficiently smooth and level for handling certain kinds of traffic or equipment that may pass over it. Moreover, while the present disclosure addresses particular sequences in FIGS. 4 and 5 for using image data, range data, and inertial data, other sequences of the method steps for cross-checking each of these data sources to deem a drop site to be acceptable are contemplated. In addition, the principles disclosed are not limited to implementation on a semi-autonomous machine in an outdoor worksite. Any machine operating under some level of computer control at worksite inside or outside could benefit from the examples and techniques disclosed and claimed.

INDUSTRIAL APPLICABILITY

The present disclosure provides a terrain verification system associated with a work machine for delivering a pallet to a land surface at a destination. Operating autonomously or semi-autonomously, the work machine includes a range sensor, an image sensor, and an inertial sensor to assess the slope and roughness of the land surface on approach to the destination. Using range data received by the range sensor, such as a LIDAR device, the terrain verification system generates a ground map of the destination. With image analysis of image data received by the image sensor, the system also checks for any obstructions on the land surface. When obstructions are found, the system moves the work machine over the land surface and evaluates pitch and roll data from the inertial sensor to determine the condition of the destination for dropping the pallet.

As noted above with respect to FIGS. 1-5, a work machine such as machine 204 includes an image sensor 222, a range sensor 226, and an inertial sensor 230. Terrain verification system 234 embedded in hardware and software, typically within machine 204, processes data from these sensors to determine a roughness metric. In one example, terrain verification system 234 analyzes image data 224 as a further check on the condition of the land surface of the destination following generation of a ground map using a LIDAR device as range sensor 226. If image data 224 indicates an obstruction, terrain verification system 234 causes machine 204 to drive over the land surface and uses inertial data 232 to determine whether the pallet may be delivered despite the obstruction, such as with light vegetation. In another example, the terrain verification system 234 generates the ground map after identifying an obstruction within image data 224.

Terrain verification system 234 may be implemented efficiently within control electronics of machine 204. In some examples, terrain verification system 234 includes a terrain mapper 238 for generating the ground map from range data 228, an obstruction detector 240 for identifying any obstructions at the destination from image data 224, and a localization system 242 for evaluating whether an obstruction within image data 224 is an impediment to delivery based on at least pitch and roll data as machine 204 traverses the destination. A roughness processor 243 may calculate a value representative of the slope and roughness of the land surface and compare that value to a predetermined roughness value. Based on the comparison, the work machine may drop the pallet at the destination or alert an operator for help.

In the examples of the present disclosure, terrain verification system 234 helps ensure safe delivery at a drop site by an autonomous or semi-autonomous work machine of cargo 220 that may be fragile or otherwise affected by an irregular land surface. With terrain verification system 234, an operator of multiple semi-autonomous machines, for instance, can focus on other activities while a machine is sent for delivery to a drop site. If terrain verification system 234 concludes that the drop site is hazardous for delivery due to being uneven, blocked, or rutted, as an example, the work machine will alert the operator for further instructions. If terrain verification system 234 concludes that the condition of drop site is acceptable after assessing input from various ones of image sensor 222, range sensor 226, and inertial sensor 230, the work machine will proceed with the instructed drop of the pallet 218 with cargo 220 at the destination.

Accordingly, work machines equipped with terrain verification system 234 can decrease risk of damage to cargo 220 when delivered to one of drop points 108. Loss of material and complications for the work machine with delivery can be avoided, increasing operating efficiency for the autonomous or semi-autonomous machines. Further, the assessment of range data, image data, and inertial (or orientation) data consistent with the present disclosure can enable a work machine to verify the topological condition of a drop site not otherwise apparent to an operator from visual inspection.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of A; B; C; A and B; A and C; B and C; A, B, and C; or multiple of any item such as A and A; B, B, and C; A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result. As an example, "substantially parallel" need not be exactly 180 degrees but may also encompass slight variations of a few degrees based on the context.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A movable work machine, comprising:
a chassis;
a range sensor, coupled to the chassis, configured to generate range data indicative of topology of a land surface at a destination of the movable work machine;
an image sensor, coupled to the chassis, configured to generate image data indicative of the topology;
an inertial sensor, coupled to the chassis, configured to generate orientation data for the movable work machine during traversal of the land surface; and
a terrain verification system, comprising:
a terrain mapper configured to convert the range data into a ground map of the land surface;
an obstruction detector configured to identify one or more obstructions on the land surface from the image data;
a localization system configured to evaluate orientation of the movable work machine from at least the orientation data; and
a roughness processor configured to determine a roughness metric representative of the topology of the land surface based on at least the ground map and to evaluate the roughness metric for accuracy with respect to the image data, wherein the roughness processor is further configured to
compare the roughness metric with a predetermined roughness threshold, and
release cargo from the work machine on the land surface at the destination when the roughness metric is less than the predetermined roughness threshold.

2. The movable work machine of claim 1, wherein the roughness processor is further configured to evaluate the roughness metric for accuracy based on the orientation during the traversal of the movable work machine over the one or more obstructions.

3. The movable work machine of claim 2, wherein the roughness processor is further configured to update the roughness metric using, at least in part, the orientation during the traversal of the movable work machine over the one or more obstructions.

4. The movable work machine of claim 3, wherein the roughness processor is further configured to determine the roughness metric based on the image data.

5. The movable work machine of claim 1, wherein the range sensor is one of a LIDAR device or a stereo camera device configured to provide depth assessment.

6. The movable work machine of claim 1, wherein the roughness processor is further configured to alert an operator when the roughness metric is greater than or equal to the predetermined roughness threshold.

7. A method for verifying terrain at a drop site for a work machine, the method comprising:
  receiving, by the work machine, an image signal indicative of image data of land surface at the drop site;
  receiving, by the work machine, a range signal indicative of range data of the land surface;
  detecting, by the work machine, an obstruction on the land surface from the image data;
  based at least in part on the detecting the obstruction, causing the work machine to move over the land surface;
  during movement over the land surface, receiving, by the work machine, inertial data indicative of at least pitch and roll of the work machine;
  determining a roughness metric for the land surface based at least in part on the pitch and roll of the work machine from the inertial data;
  comparing the roughness metric with a predetermined roughness threshold;
  determining the roughness metric to be less than the predetermined roughness threshold; and
  releasing the payload from the work machine on the land surface at the destination when the roughness metric is less than the predetermined roughness threshold.

8. The method of claim 7, further comprising:
  determining the roughness metric to be greater than or equal to the predetermined roughness threshold;
  generating a notification; and
  sending the notification to an operator of the work machine for assistance.

9. The method of claim 7, further comprising:
  generating, by a range sensor, the range signal for detecting objects in the environment about the work machine.

10. The method of claim 7, further comprising:
  prior to detecting the obstruction, converting the range data into a ground map of the land surface; and
  determining an initial roughness metric based at least in part on the ground map.

11. The method of claim 10, further comprising:
  determining the initial roughness metric to be less than the predetermined roughness threshold; and
  releasing cargo from the work machine onto the land surface at the destination.

12. The method of claim 11, wherein determining the roughness metric comprises updating the initial roughness metric based on the pitch and roll of the work machine from the inertial data.

13. The method of claim 11, further comprising:
  causing the work machine to advance towards the drop site, wherein the receiving the image signal and the receiving the range signal occur during the advance of the work machine towards the drop site.

14. The method of claim 7, further comprising:
  prior to detecting the obstruction, converting the range data into a ground map of the land surface, wherein the roughness metric is based on the ground map and the pitch and roll of the work machine.

15. A semi-autonomous compact loader, comprising:
  a chassis;
  traction devices coupled between the chassis and ground;
  a work tool coupled to a front of the chassis with respect to a direction of forward travel of the semi-autonomous compact loader, the work tool being configured to enable lifting and lowering a payload;
  a range sensor configured to generate range data indicative of topology of a land surface at a destination proximate to the semi-autonomous compact loader;
  an image sensor configured to generate image data indicative of the topology;
  an inertial sensor configured to generate orientation data for the semi-autonomous compact loader during traversal of the land surface;
  a terrain mapper configured to convert the range data into a ground map of the land surface;
  an obstruction detector configured to identify one or more obstructions on the land surface from image data;
  a localization system configured to evaluate orientation of the semi-autonomous compact loader from at least the orientation data; and
  a roughness processor configured to determine a roughness metric representative of the topology of the land surface based on at least the ground map and to evaluate the roughness metric for validity with respect to the image data, wherein the roughness processor is further configured to compare the roughness metric with a predetermined roughness threshold and to release the payload from the semi-autonomous compact loader on the land surface at the destination when the roughness metric is less than the predetermined roughness threshold.

16. The semi-autonomous compact loader of claim 15, wherein the roughness processor is further configured to evaluate the roughness metric for validity based on the orientation during the traversal of the semi-autonomous compact loader over the one or more obstructions.

17. The semi-autonomous compact loader of claim 16, wherein the roughness processor is further configured to refine the roughness metric based on the orientation during the traversal of the semi-autonomous compact loader over the one or more obstructions.

18. The semi-autonomous compact loader of claim 15, wherein the image sensor is one of a high dynamic range (HDR) camera and an ultra-sonic camera.

19. The semi-autonomous compact loader of claim 15, wherein the roughness processor is further configured to alert an operator when the roughness metric is greater than or equal to the predetermined roughness threshold.

20. The semi-autonomous compact loader of claim 15, wherein the range sensor is one of a LIDAR device or a stereo camera device configured to provide depth assessment.

* * * * *